United States Patent
Fu et al.

(10) Patent No.: US 11,310,819 B2
(45) Date of Patent: Apr. 19, 2022

(54) METHOD AND DEVICE OF DETERMINING SCHEDULING OF SHORTENED SUBFRAMES

(71) Applicant: Samsung Electronics Co., Ltd., Suwon-si (KR)

(72) Inventors: Jingxing Fu, Beijing (CN); Yi Wang, Beijing (CN); Yingyang Li, Beijing (CN); Shichang Zhang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/067,405

(22) PCT Filed: Dec. 29, 2016

(86) PCT No.: PCT/KR2016/015478
§ 371 (c)(1),
(2) Date: Jun. 29, 2018

(87) PCT Pub. No.: WO2017/116164
PCT Pub. Date: Jul. 6, 2017

(65) Prior Publication Data
US 2019/0007960 A1    Jan. 3, 2019

(30) Foreign Application Priority Data
Dec. 30, 2015 (CN) .......................... 201511020584.X

(51) Int. Cl.
*H04W 72/12* (2009.01)
*H04W 72/04* (2009.01)
(Continued)

(52) U.S. Cl.
CPC ....... *H04W 72/1289* (2013.01); *H04L 1/0038* (2013.01); *H04L 5/0048* (2013.01);
(Continued)

(58) Field of Classification Search
CPC .............. H04L 1/0038; H04L 5/0053; H04W 72/0446; H04B 7/0452; H04B 7/0456
See application file for complete search history.

(56) References Cited

U.S. PATENT DOCUMENTS

| 2012/0320846 | A1* | 12/2012 | Papasakellariou .. H04W 72/042 370/329 |
| 2014/0071954 | A1* | 3/2014 | Au .................... H04W 72/0446 370/336 |

(Continued)

FOREIGN PATENT DOCUMENTS

CN       104468030 A       3/2015

OTHER PUBLICATIONS

European Search Report dated Nov. 13, 2018, issued in the European Application No. 16882116.3-1219 / 3398285.
(Continued)

*Primary Examiner* — Romani Ohri
(74) *Attorney, Agent, or Firm* — Jefferson IP Law, LLP

(57) ABSTRACT

The present application discloses a method of determining scheduling of shortened subframes. The method includes: a UE determines a time-frequency position of a candidate PDCCH/EPDCCH which schedules PDSCH/PUSCH of a shortened subframe; the UE performs a pre-determined number of blind detections of the candidate PDCCH/EPDCCH at the time-frequency position. The present application also provides a device. The technical mechanism of the present application can make shortened subframes to function normally, thereby reduce time delay in data transmission.

18 Claims, 3 Drawing Sheets

(51) Int. Cl.
*H04L 5/00* (2006.01)
*H04L 1/00* (2006.01)

(52) U.S. Cl.
CPC .......... *H04L 5/0053* (2013.01); *H04L 5/0094* (2013.01); *H04W 72/0446* (2013.01)

(56) References Cited

U.S. PATENT DOCUMENTS

| | | | |
|---|---|---|---|
| 2015/0245323 A1 | 8/2015 | You et al. | |
| 2016/0066290 A1* | 3/2016 | Cohen | H04W 56/0015 370/336 |
| 2016/0087709 A1* | 3/2016 | Horiuchi | H04L 5/0042 375/260 |
| 2017/0164363 A1 | 6/2017 | Zhang et al. | |
| 2017/0290008 A1* | 10/2017 | Tooher | H04L 1/1893 |
| 2017/0318564 A1* | 11/2017 | Lee | H04L 5/0092 |
| 2017/0325164 A1* | 11/2017 | Lee | H04W 76/27 |
| 2017/0331547 A1* | 11/2017 | Kim | H04B 7/26 |
| 2018/0063820 A1* | 3/2018 | Xiong | H04W 72/042 |
| 2018/0098337 A1* | 4/2018 | Lee | H04W 72/1278 |
| 2018/0206266 A1* | 7/2018 | Byun | H04W 72/14 |
| 2018/0287742 A1* | 10/2018 | Feng | H04L 1/1887 |
| 2018/0288779 A1* | 10/2018 | Dai | H04W 40/22 |
| 2019/0098605 A1* | 3/2019 | Seo | H04W 72/02 |

OTHER PUBLICATIONS

Huawei et al., 'Control signaling enhancements for short TTI', R1-156461, 3GPP TSG RAN WG1 Meeting #83, Nov. 7, 2015, Anaheim, USA.
Samsung, 'Study on specification impact for downlink due to TTI shortening', R1-156819, 3GPP TSG RAN WG1 Meeting #83, Nov. 6, 2015, Anaheim, USA.
Huawei et al., 'Overview of short TTI', R1-156458, 3GPP TSG RAN WG1 Meeting #83, Nov. 7, 2015, Anaheim, USA.
ZTE, 'L1 considerations on latency reduction', R1-157151, 3GPP TSG RAN WG1 Meeting #83, Nov. 7, 2015, Anaheim, USA.
Interdigital Communications, 'Support for Short TTIs and Processing Times in LTE', R1-157136, 3GPP TSG-RAN WG1 #83, Nov. 7, 2015, Anaheim, USA.

* cited by examiner

[Fig. 1]
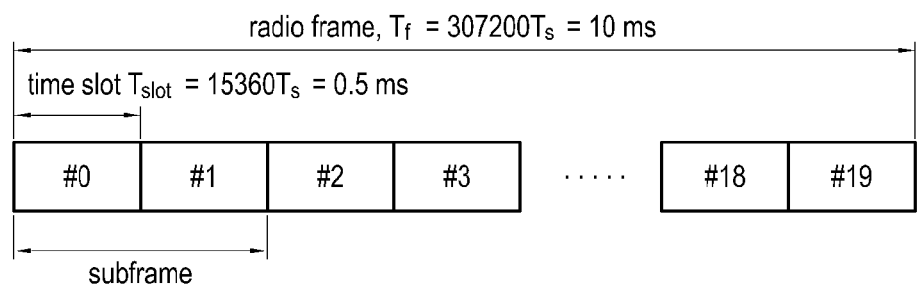
[Fig. 2]
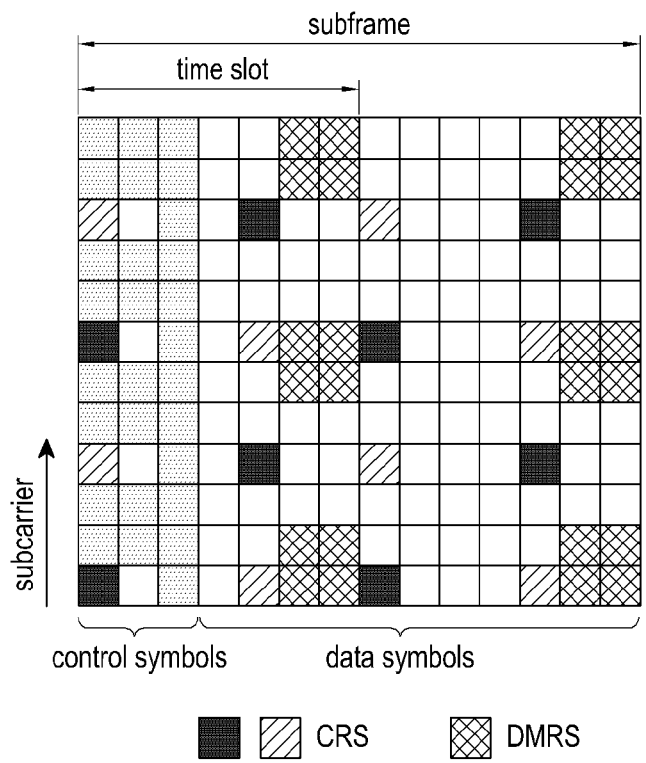

[Fig. 3]
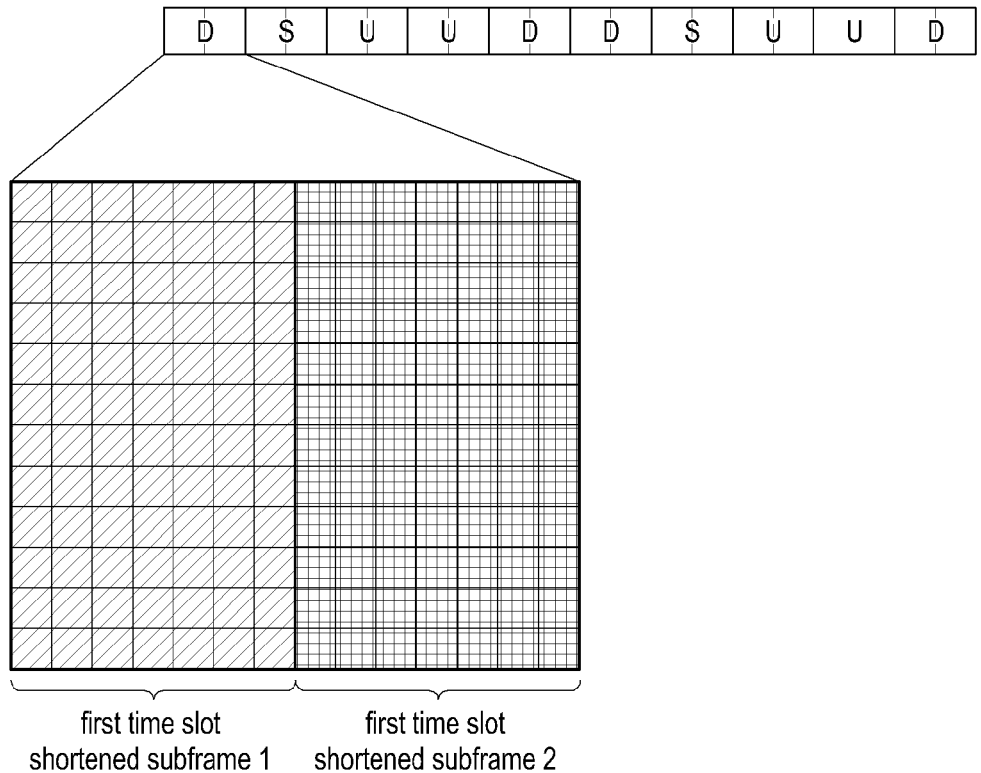
[Fig. 4]
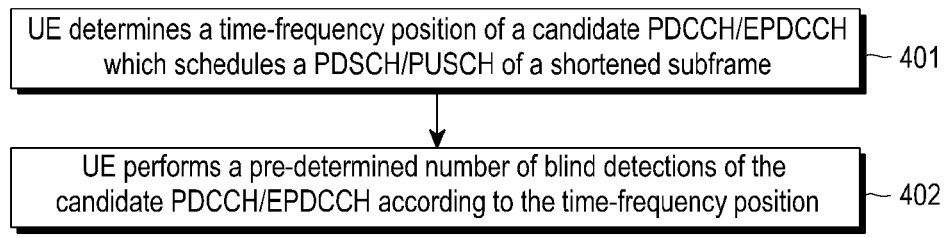
[Fig. 5]
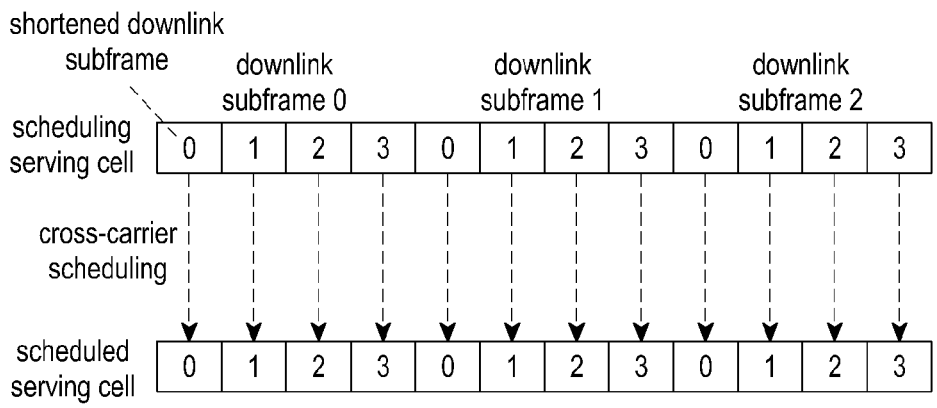

[Fig. 6]
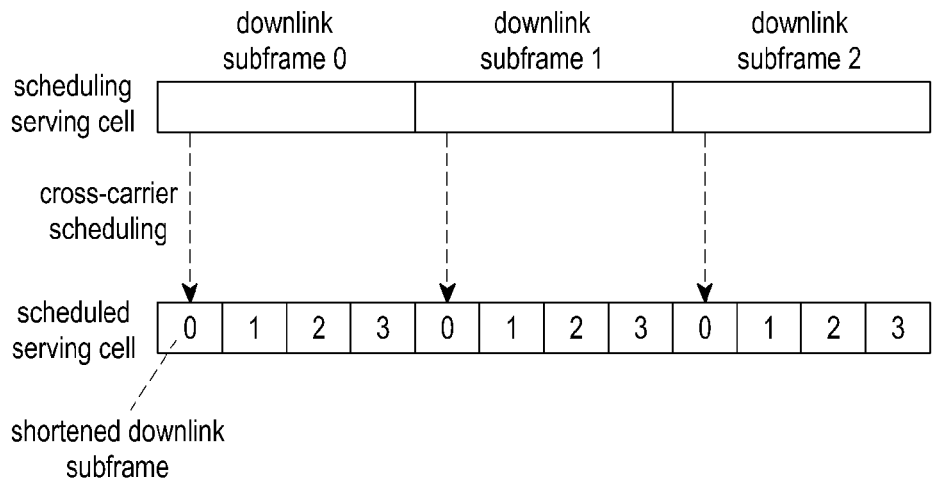
[Fig. 7]
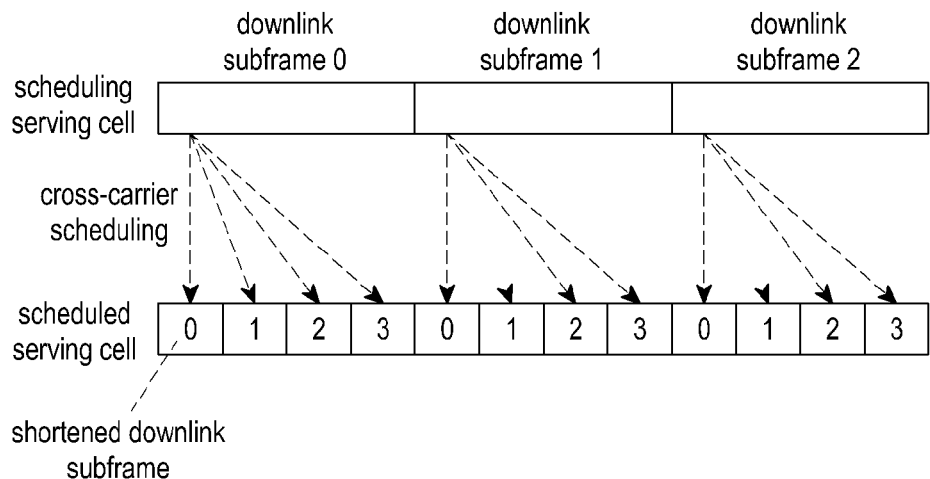
[Fig. 8]
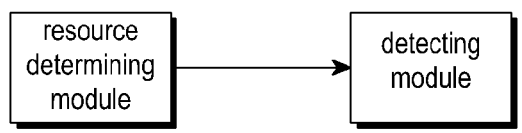

METHOD AND DEVICE OF DETERMINING SCHEDULING OF SHORTENED SUBFRAMES

CROSS-REFERENCE TO RELATED APPLICATION(S)

This application is based on and claims priority under 35 U.S.C § 119 to Chinese Patent Application No. 201511020584.X, filed on Dec. 30, 2015, in the State Intellectual Property Office, the disclosure of which is incorporated by reference herein its entirety.

The present invention relates to wireless communication systems, and particularly, to a method and a device of determining scheduling of shortened subframes.

BACKGROUND

In 3GPP LTE systems, each radio frame lasts 10 ms and is devided into 10 equal subframes. A downlink transmission time interval (TTI) is defined as a subframe. FIG. 1 is a schematic diagram illustrating a frame structure of a frequency division duplex (FDD) system. Each downlink subframe includes two time slots. Each time slot includes 7 orthogonal frequency division multiplexing (OFDM) symbols with a normal cyclic prefix (CP) or 6 OFDM symbols with an extended CP.

FIG. 2 is a schematic diagram illustrating a subframe structure in an LTE system. The first n (n equals 1, 2, 3 or 4) OFDM symbols are for transmitting physical downlink control channel (PDCCH) which includes downlink control information (DCI), physical hybrid ARQ indicator channel (PHICH), and physical control format indicator channel (PCFICH) which specifies the size of control channel areas. Enhanced physical downlink control channel (EPDCCH) which may also include DCI. The other OFDM symbols are for transmitting physical downlink shared channel (PDSCH). PDSCH is scheduled by a preceeding PDCCH in the same subframe or by an EPDCCH in the same subframe, or by a PDCCH/EPDCCH in a downlink subframe of another serving cell in a cross-carrier manner. The "/" in "PDCCH/EPDCCH" represents "or".

The PCFICH indicates the value of n which is the number of the first n OFDM symbols in the current subframe that are for transmitting DCI. The value of n may be indicated using a control format indicator (CFI), and the PCFICH is for transmitting the CFI. The correspondence between CFI values and the number of OFDM symbols for transmitting DCI may be as shown in Table 1.

TABLE 1

Correspondence between CFI values and the number of OFDM symbols for transmitting DCI

| CFI | The number of physical resource blocks in system bandwidth is larger than 10 | The number of physical resource blocks in system bandwidth is smaller than or equal to 10 |
|---|---|---|
| 1 | 1 | 2 |
| 2 | 2 | 3 |
| 3 | 3 | 4 |
| Reserved | | |

The PCFICH occupies 16 resource elements (RE) which form 4 resource element groups (REG). Each REG includes 4 REs. The 4 REGs are in the first OFDM symbols.

The PHICH is for specifying HARQ-ACK information of data transmitted in a physical uplink shared channel (PUSCH). The PHICH occupies 12 RE which forms 3 REGs.

A PDCCH which whose demodulation is based on a de modulation reference signal (DMRS) is referred to as an EPDCCH. Resources of an EPDCCH are configured via radio resource control (RRC) signaling. In LTE R-11 systems, EPDCCH is used only for UE-specific search space. EPDCCHs are in EPDCCH sets. EPDCCH sets include centralized EPDCCH sets and distributed EPDCCH sets. The centralized EPDCCH sets and distributed EPDCCH sets may occupy 2, 4, or 8 physical resource blocks (PRB). Each UE may be configured at most 2 EPDCCH sets. An EPDCCH is composed of enhanced control channel elements (ECCE). Each EPDCCH may be composed of 1 ECCE, 2 ECCEs, 4 ECCEs, 8 ECCEs, 16 ECCEs or 32 ECCEs. Each ECCE is composed of enhanced resource element groups (EREG). Each ECCE may include 4 or 8 EREGs, and each PRB may include 16 EREG.

SUMMARY

With user's requirement for data time delay becoming higher, people then proposed a concept of shortened TTI (referred to as shortened subframe hereinafter) because some services are very sensitive to time delay, to shorten data processing time by shortening data transmission blocks. Therefore, data transmission delay can be reduced, and user experience can be improved. For example, a conventional subframe of 1 ms is changed into 2 subframes of 0.5 ms. As shown in FIG. 3, the first time slot is a shortened subframe, and the second time slot is also a shortened subframe. Alternatively, a shortened subframe may be shorter than 0.5 ms. For example, the size of each shortened subframe may be 1 OFDM symbol or 2 OFDM symbols, or the like. That is, a shortened subframe is shorter than a normal subframe (which lasts 1 ms). It remains a subject to be studied regarding how to schedule PDSCH and PUSCH in a shortened subframe.

The present invention provides a method and a device of determining scheduling of shortened subframes to implement scheduling of PDSCH and PUSCH in shortened subframes, so that shortened subframes can work and the time delay in data transmission can be reduced.

The present application provides a method of determining scheduling of shortened subframes. The method includes: determining, by a user equipment (UE), a time-frequency position of a candidate physical downlink control channel (PDCCH) or an enhanced physical downlink control channel (PDCCH) which schedules a physical downlink shared channel (PDSCH) or a physical uplink shared channel (PUSCH) in a shortened subframe; and performing a predetermined number of blind detections of the candidate PDCCH/EPDCCH according to the time-frequency position.

Preferably, the time-frequency position of the PDCCH includes the number of physical resource blocks (PRB) occupied by the PDCCH, the positions of the PRBs, and the number of OFDM symbols occupied by the PDCCH.

Preferably, the UE determines the time-frequency position of the candidate PDCCH/EPDCCH which schedules the PDSCH/PUSCH in the shortened subframe by at least one of: manner a: determining the positions of the PRBs occupied by the PDCCH which schedules the shortened subframe in each downlink subframe, the number of the PRBs and the number of OFDM symbols occupied by the PDCCH which schedules the shortened subframe according to pre-determined configurations; manner b: determining the positions of the PRBs occupied by the PDCCH which schedules the shortened subframe and the number of the PRBs according to pre-determined configurations, and determining the number of OFDM symbols occupied by the PDCCH according to an indication obtained from physical layer signaling; manner c: determining the positions of the PRBs occupied by the PDCCH which schedules the shortened subframe and the number of the PRBs according to configurations obtained from higher layer signaling, and determining the number of OFDM symbols occupied by the PDCCH according to configurations obtained from higher layer signaling; manner d: determining the positions of PRBs occupied by the PDCCH which schedules the shortened subframe and the number of the PRBs according to configurations obtained from higher layer signaling, and determining the number of OFDM symbols occupied by the PDCCH according to an indication obtained from physical layer signaling; manner e: determining at least one combination of the positions of PRBs occupied by the PDCCH which schedules the shortened subframe, the number of the PRBs and the number of OFDM symbols according to configurations obtained from higher layer signaling, and determining one of the at least one combination according to an indication obtained from physical layer signaling; manner f: determining the positions of the PRBs occupied by the PDCCH which schedules the shortened subframe in each downlink subframe, the number of the PRBs and the number of OFDM symbols occupied by the PDCCH which schedules the shortened subframe according to an indication obtained from physical layer signaling; manner g: determining the time-frequency position in each downlink subframe according to two indications obtained from physical layer signaling, of which one indication is for determining the positions of PRBs occupied by the PDCCH which schedules the shortened subframe and the number of the PRBs, and the other indication is for determining the number of OFDM symbols occupied by the PDCCH; manner h: determining at least one combination of the positions of PRBs occupied by the PDCCH which schedules the shortened subframe and the number of the PRBs according to configurations obtained from higher layer signaling, and determining one of the at least one combination according to a first indication obtained from physical layer signaling; determining the number of OFDM symbols occupied by the PDCCH according to a second indication obtained from physical layer signaling; manner i: determining the positions of PRBs occupied by the PDCCH which schedules the shortened subframe and the number of the PRBs according to an indication obtained from type-1 physical layer signaling, and determining the number of OFDM symbols occupied by the PDCCH according to an indication obtained from type-2 physical layer signaling; manner j: determining the positions of PRBs occupied by the PDCCH which schedules the shortened subframe in each downlink subframe, the number of the PRBs and the number of OFDM symbols occupied by the PDCCH according to an indication obtained from type-3 physical layer signaling; manner k: determining the number of OFDM symbols occupied by the PDCCH which schedules the shortened subframe in each downlink shortened subframe according to pre-determined configurations, and determining the positions of PRBs occupied by the PDCCH which schedules the shortened subframe and the number of the PRBs according to higher layer signaling or physical layer signaling; manner l: determining the number of OFDM symbols occupied by the PDCCH which schedules the shortened subframe in each downlink shortened subframe according to higher layer signaling, and determining the positions of PRBs occupied by the PDCCH which schedules the shortened subframe and the number of the PRBs according to higher layer signaling or physical layer signaling.

Preferably, according to the manner a and the manner b, the positions of PRBs occupied by the PDCCH and the number of the PRBs are fixed or vary according to system bandwith of the serving cell.

Preferably, the PRBs determined by the UE according to pre-determined configurations or according to higher layer signaling are centralized or distributed.

Preferably, according to the manners b, d, e, f, g, k, l, the physical layer signaling is transmitted in each shortened downlink subframe or in the first shortened downlink subframe in each downlink subframe. When the physical layer signaling is transmitted in each shortened downlink subframe in each downlink subframe, information indicated by physical layer signaling transmitted is identical or different in each shortened downlink subframe.

Preferably, according to the manner h, the first indication of physical layer signaling is transmitted in the first shortened subframe in each downlink subframe, and the second indication of physical layer signaling is transmitted in each shortened downlink subframe.

Preferably, according to the manner i, the type-1 physical layer signaling is transmitted in each shortened downlink subframe of the downlink subframe except the last shortened downlink subframe; the type-1 physical layer signaling transmitted in the current shortened downlink subframe indicates the positions of PRBs occupied by the PDCCH in the next shortened downlink subframe of the current shortended downlink subframe and the number of the PRBs; the type-2 physical layer signaling is transmitted in each shortened subframe.

Preferably, according to the manner j, the type-3 physical layer signaling is transmitted in each shortened downlink subframe of the downlink subframe except the last shortened downlink subframe; the type-3 physical layer signaling transmitted in the current shortened downlink subframe indicates the positions of PRBs occupied by the PDCCH in the next shortened downlink subframe of the current shortended downlink subframe and the number of the PRBs.

Preferably, the procedure of the UE determines the time-frequency position of the candidate PDCCH/EPDCCH which schedules the PDSCH/PUSCH of the shortened subframe includes:

determining, by the UE, the time-frequency position of the candidate PDCCH/EPDCCH of all of the shortened subframe of the downlink subframe according to physical layer signaling transmitted in the first shortened subframe of each downlink subframe.

Preferably, the format and transmission manner of the physical layer signaling is any one of the following:

manner 1) the physical layer signaling is coded according to the format of PCFICH into n bit of information, n=1 or 2, and is transmitted using physical resources of any of the following a to c:

a. the physical layer signaling occupies legacy PHICH resources of the current subframe, and the legacy PHICH resources are configured by higher layer signaling or specified in pre-determined configurations;

b. the physical layer signaling occupies legacy PDCCH resources of the current subframe, the REG occupied are configured by higher layer signaling or specified in pre-determined configurations;

c. the physical layer signaling occupies resources of the current shortened subframe, the occupied resources are specified in pre-determined configurations or configured by higher layer signaling;

manner 2) the physical layer signaling is coded according to the format of PDCCH, and is transmitted using physical resources of any of a to c:
  a. the physical layer signaling occupies legacy PHICH resources of the current subframe, the PHICH resources occupied are configured by higher layer signaling or specified in pre-determined configurations;
  b. the physical layer signaling occupies legacy PDCCH resources of the current subframe, and an occupied REG is configured by higher layer signaling or specified in pre-determined configurations;
  c. the physical layer signaling occupies resources of the current shortened subframe, the occupied resources are specified in pre-determined configurations or configured by higher layer signaling;

manner 3) the physical layer signaling is coded according to the format of PDCCH, and is transmitted in physical resources of a orb:
  a. the physical layer signaling is transmitted in public physical layer signaling;
  b. the physical layer signaling is transmitted in resources of the current shortened subframe;

manner 4) the physical layer signaling is coded according to the format of PHICH, and is transmitted in physical resources of a or b:
  a. the physical layer signaling occupies legacy PHICH resources of the current subframe, the PHICH resources occupied are configured by higher layer signaling or specified in pre-determined configurations;
  b. the physical layer signaling occupies resources of the current shortened subframe, the occupied resources are specified in pre-determined configurations or configured by higher layer signaling.

Preferably, the UE determines the time-frequency position of the candidate PDCCH/EPDCCH of the PDSCH/PUSCH to be scheduled in the shortened subframe by at least one of:

manner a1, determining according to the legacy PCFICH, and the number of OFDM symbols occupied by PDCCH of the shortened subframe is identical to the number of OFDM symbols occupied by the legacy PDCCH, the PDCCH of the shortened subframe occupies the whole bandwidth; or the number of PRBs and the PRB positions are configured by higher layer signaling or are the number and the positions of PRBs configured for transmitting the shortened PDSCH;

manner b1: determining at least one combination of the positions of PRBs occupied by the PDCCH, the number of the PRBs, and the number of OFDM symbols according to configurations obtained from higher layer signaling, and determining one of the at least one combination according to an indication in legacy PCFICH;

manner c1: determining at least one combination of the positions of PRBs occupied by the PDCCH, the number of the PRBs, and the number of OFDM symbols occupied by the PDCCH according to configurations obtained from higher layer signaling, and determining one of the at least one combination according to an indication obtained from the legacy PCFICH.

Preferably, the procedure of the UE determines the time-frequency position of the candidate PDCCH/EPDCCH which schedules the PDSCH/PUSCH of the shortened subframe includes:

determining the time-frequency position of time-frequency resources occupied by an EPDCCH which schedules a shortened subframe according to configurations obtained from higher layer signaling.

Preferably, if a downlink subframe includes at least two shortened downlink subframes, the first shortened downlink subframe in the at least two shortened downlink subframes is scheduled by a PDCCH which schedules a downlink subframe of 1 ms, and the PDSCH of the other of the at least two shortened downlink subframes is scheduled by PDCCH or EPDCCH which is determined according to configurations obtained from higher layer signaling; if the PDSCH of a shortened downlink subframe is scheduled by an EPDCCH, the EPDCCH occupies all of OFDM symbols of the shortened downlink subframe.

Preferably, for the same UE, it is determined according to configurations obtained from higher layer signaling as to whether a downlink subframe of 1 ms is scheduled by a PDCCH in a UE-specific search space or by an EPDCCH in a UE-specific search space; whether shortened downlink subframes in the same downlink subframe is scheduled by a PDCCH or an EPDCCH and the manner of scheduling a downlink subframe of 1 ms are determined independently of each other.

Preferably, for the same UE, it is determined according to configurations obtained from higher layer signaling as to whether a downlink subframe of 1 ms is self-scheduled or cross-carrier scheduled; shortened downlink subframes in the same downlink subframe are scheduled in the same manner with the scheduling manner of a downlink subframe of 1 ms; or it is determined according to configurations obtained from higher layer signaling as to whether the shortened downlink subframes in the same downlink subframe are self-scheduled or cross-carrier scheduled.

Preferably, if a shortened downlink subframe is cross-carrier scheduled, when a serving cell which schedules the shortened subframe is configured with shortened downlink subframe, a shortened downlink subframe m in a downlink subframe n in the serving cell cross-carrier schedules a shortened downlink subframe m in a downlink subframe n in another serving cell; and/or if a shortened downlink subframe is cross-carrier scheduled, if a shortened subframe m to be scheduled in subframe n of a scheduled serving cell is a downlink shortened subframe and a downlink subframe in a scheduling serving cell does not support a downlink shortened subframe, a PDCCH of a downlink subframe of 1 ms schedules the first downlink shortened subframe, and the other of downlink shortened subframes except the first downlink shortened subframe in each downlink subframe are not scheduled, or the PDCCH of the downlink subframe of 1 ms cross-carrier schedules all of downlink shortended subframes in the downlink subframe.

The present application also provides a device. The device includes a resources determining module and a detecting module.

The resource determining module is configured for determining a time-frequency position of a candidate PDCCH/EPDCCH which schedules PDSCH/PUSCH of a shortened subframe; and the detecting module is configured for performing a pre-determined number of blind detections of the candidate PDCCH/EPDCCH according to the time-frequency location.

According to the above technical mechanism, the method and the device of the present application can enable a UE to determine the position of PDCCH/EPDCCH which schedules PDSCH and PUSCH of a shortened subframe, so that shortened subframes can be used together with normal subframes.

BRIEF DESCRIPTION OF THE DRAWINGS

FIG. 1 is a schematic diagram illustrating a frame structure in a conventional FDD system;

FIG. 2 is a schematic diagram illustrating a frame structure in a conventional LTE system;

FIG. 3 is a schematic diagram illustrating a conventional shortened subframe;

FIG. 4 is a schematic diagram illustrating a preferable method of determining scheduling of a shortened subframe by a UE of the present application;

FIG. 5 is a schematic diagram illustrating cross-carrier scheduling of the present application;

FIG. 6 is a schematic diagram illustrating cross-carrier scheduling of the present application;

FIG. 7 is a schematic diagram illustrating cross-carrier scheduling of the present application;

FIG. 8 is a schematic diagram illustrating the structure of a device of the present disclosure.

DETAILED DESCRIPTION OF THE DISCLOSURE

In order to make the object, solution and merits of the present invention clearer, a detailed description of the present invention is hereinafter given with reference to specific embodiments and the accompanying drawings.

The present application provides a method of determining scheduling of the above shortened subframe. As shown in FIG. 4, the method includes the following procedures.

Step 401, a UE determines a time-frequency position of a candidate PDCCH/EPDCCH which schedules a PDSCH/PUSCH of a shortened subframe.

Step 402, the UE performs a pre-determined number of blind detections of the candidate PDCCH/EPDCCH according to the time-frequency position.

The PDSCH/PUSCH of a normal subframe can be scheduled by a PDCCH or an EPDCCH. The PDSCH/PUSCH of a shortened subframe can also be scheduled by a PDCCH or an EPDCCH, which are respectively described in the following.

First described is a method of determining a position of a PDCCH which schedules a shortened subframe when PDSCH/PUSCH of a shortened subframe is scheduled by the PDCCH. The position of the PDCCH in this embodiment includes the number of PRBs occupied by the PDCCH, the positions of the PRBs, and the number of OFDM symbols occupied by the PDCCH. It is assumed in this embodiment that OFDM symbols occupied by the PDCCH starts from the first OFDM symbol in the shortened subframe.

In a first situation, the UE obtains the position of the PDCCH from an indication in received signaling.

Manner a: The positions of PRBs occupied by the PDCCH which schedules the shortened subframe in each downlink subframe, the number of PRBs and the number of OFDM symbols occupied by the PDCCH which schedules the shortened subframe are determined by a protocol (i.e., "according to pre-determined configurations"). According to one manner, the positions of PRBs occupied by the PDCCH which schedules the shortened subframe and the number of the PRBs are fixed, and are not related with system bandwidth of the serving cell, e.g., the PDCCH which schedules the shorted subframe occupies one or multiple PRBs of 6 PRBs in the middle. According to another manner, the positions of PRBs occupied by the PDCCH which schedules the shortened subframe and the number of the PRBs are related with system bandwidth of the serving cell, and vary with system bandwidth of the serving cell. According to the two manners, the PRBs determined may be centralized or distributed, and the number of OFDM symbols occupied by the PDCCH remains unchanged (e.g., the PDCCH occupies n OFDM symbols, n equals 1 or 2).

Manner b: the positions of PRBs occupied by the PDCCH which schedules the shortened subframe and the number of the PRBs are defined in a protocol, and the PRBs determined may be centralized or distributed. The number of OFDM symbols occupied by the PDCCH which schedules the shortened subframe is specified by physical layer signaling. The physical layer signaling is transmitted once in each downlink subframe. The PDCCH occupies the same number of OFDM symbols in each downlink shortened subframe within the same downlink subframe. The format of the physical layer signaling will be described below, and the physical layer signaling is transmitted in the first shortened subframe in the downlink subframe. Or, the physical layer signaling is transmitted once in each downlink shortened subframe, and the number of OFDM symbols occupied by the PDCCH in different downlink shortened subframe may be the same or may be different, and may be specified individually. The format of the physical layer signaling will be described below.

Manner c: The positions of PRBs occupied by the PDCCH which schedules the shortened subframe and the number of the PRBs are configured obtained from higher layer signaling. The PRBs configured may be centralized or distributed. The number of OFDM symbols occupied by the PDCCH which schedules the shortened subframe is configured by higher layer signaling. It is configured that OFDM symbols which transmit the PDCCH which schedules the shortened subframe starts from the first OFDM symbol of the shortened subframe.

Manner d: The positions of PRBs occupied by the PDCCH which schedules the shortened subframe and the number of the PRBs are configured obtained from higher layer signaling. The PRBs configured may be centralized or distributed. The number of OFDM symbols occupied by the PDCCH which schedules the shortened subframe is specified by physical layer signaling. The physical layer signaling is transmitted once in each downlink subframe. The PDCCH occupies the same number of OFDM symbols in all of downlink shortened subframe of one downlink subframe. The format of the physical layer signaling will be described below, and the physical layer signaling is transmitted in the first shortened subframe in the downlink subframe. Or, the physical layer signaling is transmitted once in each downlink shortened subframe, and the number of OFDM symbols occupied by the PDCCH in different downlink shortened subframe may be the same or may be different, and may be specified individually. The format of the physical layer signaling will be described below.

Manner e: Multiple combinations of the positions of PRBs occupied by the PDCCH which schedules the shortened subframe, the number of the PRBs, and the number of OFDM symbols are configured by higher layer signaling, and one of the multiple combinations are specified by physical layer signaling. The physical layer signaling is transmitted once in each downlink subframe. All of downlink shortened subframes of one downlink subframe is configured with the same combination. The format of the physical layer signaling will be described below, and the physical layer signaling is transmitted in the first shortened subframe in the downlink subframe. Or, the physical layer signaling is transmitted once in each downlink shortened subframe, and the combination for different downlink shortened subframes may be specified individually, and may be the same or may be different. The format of the physical layer signaling will be described below. The PRBs configured may be contralized or distributed. It is configured that OFDM symbols which transmit the PDCCH which schedules the shortened subframe starts from the first OFDM symbol of the shortened subframe.

Manner f: the positions of PRBs occupied by the PDCCH which schedules the shortened subframe, the number of the PRBs, and the number of OFDM symbols occupied by the PDCCH which schedules the shortened subframe are specified by a physical layer signaling in each downlink subframe. The physical layer signaling is transmitted in the first shortened subframe in the downlink subframe. The PDCCH which schedules a shortened subframe occupy all of shortened subframes in the downlink subframe have the same number of PRBs at the same position and the same number of OFDM symbols occupied by the PDCCH which schedules the shortened subframe. The format of the physical layer signaling will be described below. Or, the physical layer signaling is transmitted in each shortened downlink subframe, indicating the positions of PRBs occupied by the PDCCH which schedules the shortened subframe and the number of the PRBs and the number of OFDM symbols occupied by the PDCCH. The position and the number of the PRBs and the number of the OFDM symbols may be the same or may be different. The format of the physical layer signaling will be described below.

Manner g: The position of the PDCCH which schedules a shortened subframe is specified by two indications obtained from physical layer signaling. The first indication of the two indications specifies the positions of PRBs occupied by the PDCCH which schedules the shortened subframe in each downlink subframe. The first indication of the physical layer signaling is transmitted in the first shortened subframe in the downlink subframe. All of downlink shortened subframes in one downlink subframe have the same number of PRBs at the same position occupied by the PDCCH which schedules the shortened subframe. Or, the first indication of the physical layer signaling is transmitted once in each shortended downlink subframe, indicating the positions of PRBs occupied by the PDCCH which schedules the shortened subframe and the number of the PRBs. The format of the physical layer signaling will be described below. Each of the other PRBs can be used for transmitting the PDCCH which schedules the shortened subframe because a backward compatible PDCCH has scheduled a PDSCH of 1 ms. The second indication of the two indications is transmitted once in each shortened downlink subframe, indicating the number of OFDM symbols occupied by the PDCCH which schedules the shortened subframe. Or, the second indication of the physical layer signaling is transmitted once in each downlink subframe, and is transmitted in the first shortened subframe in each downlink subframe. All of downlink shortened subframes in one downlink subframe have the same number of OFDM symbols occupied by the PDCCH which schedules the shortened subframe. The format of the physical layer signaling indication will be described below.

Manner h: Multiple combinations of the positions of PRBs occupied by the PDCCH which schedules the shortened subframe and the number of PRBs are configured by higher layer signaling. A first physical layer signaling indication specifies one of the multiple combinations. The first physical layer signaling indication is transmitted in the first shortened subframe in the downlink subframe. All of downlink shortened subframes have the same number of PRBs at the same position occupied by the PDCCH which schedules the shortened subframe. The format of the first physical layer signaling indication will be described below. A second physical layer signaling indication is transmitted once in each shortened downlink subframe, specifying the number of OFDM symbols occupied by the PDCCH which schedules the shortened subframe.

Manner i: Type-1 physical layer signaling specifies the positions of PRBs occupied by the PDCCH which schedules the shortened subframe and the number of PRBs. The type-1 physical layer signaling is transmitted once in each shortened downlink subframe except the last shortened downlink subframe in a downlink subframe. The type-1 physical layer signaling indicates the number of PRBs occupied by the PDCCH which schedules the next shortened downlink subframe of the current shortened downlink subframe and the number of the PRBs. Type-2 physical layer signaling specifies the number of OFDM symbols occupied by the PDCCH which schedules the shortened subframe, and is transmitted in each shortened subframe.

Manner j: Type-3 physical layer signaling specifies the positions of PRBs occupied by the PDCCH which schedules the shortened subframe, the number of PRBs and the number of OFDM symbols occupied by the PDCCH. The type-3 physical layer signaling is transmitted once in each shortened downlink subframe except the last shortened downlink subframe in a subframe. The type-3 physical layer signaling transmitted in the current shortened downlink subframe specifies the number of PRBs occupied by the PDCCH which schedules the next shortened downlink subframe of the current shortened downlink subframe and the number of the PRBs.

Manner k: The number of OFDM symbols occupied by the PDCCH which schedules the shortened subframe in each downlink shortened subframe is defined in a protocol, e.g., the PDCCH which schedules the shortened subframe occupies 1 or 2 OFDM symbols. The positions of PRBs occupied by the PDCCH which schedules the shortened subframe and the number of the PRBs are configured by higher layer signaling. Or, the positions of PRBs occupied by the PDCCH which schedules the shortened subframe and the number of the PRBs are specified by physical layer signaling. The physical layer signaling is transmitted in the first shortened subframe of each downlink subframe or in each shortened downlink subframe of a downlink subframe.

Manner l: The number of OFDM symbols occupied by the PDCCH in each downlink shortened subframe which schedules the shortened subframe is configured by higher layer signaling. The positions of PRBs occupied by the PDCCH which schedules the shortened subframe and the number of the PRBs are configured by higher layer signaling. Or, the positions of PRBs occupied by the PDCCH which schedules the shortened subframe and the number of the PRBs are specified by physical layer signaling. The physical layer signaling is transmitted in the first shortened subframe of each downlink subframe or in each shortened downlink subframe of a downlink subframe.

The following describes the format of the above physical layer signaling and the transmission methods. The present application provides the following preferred embodiments.

Manner 1) The physical layer signaling is coded according to the format of PCFICH into n bits (n=1 or 2), and transmitted using physical resources of any of a to c:

a. the physical layer signaling occupies legacy PHICH resources of the current subframe, and the PHICH resources occupied are configured by higher layer signaling or specified in a protocol;
b. the physical layer signaling occupies legacy PDCCH resources of the current subframe, and an occupied REG is configured by higher layer signaling or defined in a protocol;
c. the physical layer signaling occupies resources (PRB positions, the number of the PRBs, the number of OFDM symbols occupied by the PDCCH) of the current shortened subframe, and the occupied resources are defined in a protocol or configured by higher layer signaling.

Manner 2) The physical layer signaling is coded according to the format of PDCCH, and is transmitted in physical resources of any of a to c:
a. the physical layer signaling occupies legacy PHICH resources of the current subframe, and the occupied PHICH resources are configured by higher layer signaling or defined in a protocol;
b. the physical layer signaling occupies legacy PDCCH resources of the current subframe, and occupied REGs are configured by higher layer signaling or defined in a protocol;
c. physical layer signaling occupies resources (PRB positions, the number of the PRBs, the number of OFDM symbols occupied by the PDCCH) of the current shortened subframe, and the occupied resources are defined in a protocol or configured by higher layer signaling.

Manner 3) The physical layer signaling is coded according to the format of PDCCH, and is transmitted in physical resources of any of a orb:
a. the physical layer signaling uses public physical layer signaling (legacy DCI). For example, the physical layer signaling is borne in DCI 1C or DCI 1A in the common search space (CSS);
b. the physical layer signaling occupies resources of the current shortened subframe, e.g., DCI 1C or DCI 1A in CSS of the shortened subframe.

Manner 4) The physical layer signaling is coded according to the format of PHICH, and is transmitted in physical resources of any of a or b:
a. the physical layer signaling occupies legacy PHICH resources of the current subframe, and the occupied PHICH resources are configured by higher layer signaling or defined in a protocol;
b. the physical layer signaling occupies resources (PRB positions, the number of the PRBs, the number of OFDM symbols occupied by the PDCCH) of the current shortened subframe, and the occupied resources are defined in a protocol or configured by higher layer signaling.

Among the above physical layer signaling, some specifies the OFDM symbols occupied by the PDCCH, e.g., physical layer signaling in PCFICH format or in PHICH format; some specifies the PRB positions and the number of PRBs, e.g., physical layer signaling in PDCCH format; and some specifies one of multiple resources combinations configured by higher layer signaling, e.g., higher layer signaling configures multiple combinations of PRB positions and the number of PRBs occupied by the PDCCH which schedules the shortened subframe and the physical layer signaling specifies one of the multiple combinations, or the physical layer signaling specifies one of multiple combinations of PRB positions and the number of PRBs occupied by the PDCCH which schedules the shortened subframe and the number of OFDM symbols occupied by the PDCCH which schedules the shortened subframe, e.g., the physical layer signaling in the PCFICH format or in the PHICH format.

In the second situation, the UE obtains the position of the PDCCH according to an inexplicit indication.

Manner a1: According to legacy PCFICH, the number of OFDM symbols occupied by the PDCCH of the shortened subframe is identical to the number of OFDM symbols occupied by the legacy PDCCH, and the bandwidth occupied by the PDCCH of the shortened subframe may be any of 1) or 2):
(1) occupying the whole bandwidth;
(2) the number of PRBs occupied and the PRB positions are configured by higher layer signaling, or being the number of PRBs and PRB positions configured for transmitting shortened PDSCH.

Manner b1: higher layer signaling configures multiple combinations of PRB positions and the number of PRBs occupied by the PDCCH, and the number of OFDM symbols occupied by the PDCCH, and the legacy PCFICH specifies one of the multiple combinations.

Manner c1: A protocol defines multiple combinations of PRB positions and the number of PRBs occupied by the PDCCH, and the number of OFDM symbols occupied by the PDCCH, and the legacy PCFICH specifies one of the multiple combinations.

The above describes the method of determining the position of a PDCCH which schedules a shortened subframe when PDSCH/PUSCH of the shortened subframe is scheduled by the PDCCH. The following describes a method of determining the position of an EPDCCH which schedules a shortened subframe when PDSCH/PUSCH of the shortened subframe is scheduled by the EPDCCH.

The time-frequency resources occupied by an EPDCCH which schedules a shortened subframe is configured individually obtained from higher layer signaling. If a downlink subframe includes multiple shortened downlink subframe, the first shortened downlink subframe in the downlink subframe is scheduled by a PDCCH which schedules a downlink subframe of 1 ms, and PDSCHs of the other shortened downlink subframes except the first shortened downlink subframe are either scheduled all by PDCCH or all by EPDCCH depending on configurations from higher layer signaling. If PDSCH of a shortened downlink subframe is scheduled by an EPDCCH, the EPDCCH occupies all of OFDM symbols of the shortened downlink subframe.

Shortened subframes of certain lengths are suitable to be scheduled by PDCCH, e.g., shorten subframes whose length is one time slot and/or 3 or 4 OFDM symbols. Since shortened subframes are used to reduce time delay in data transmission, if a shortened subframe includes multiple OFDM symbols, PDCCH is best transmitted using OFDM symbols at head portions of the shortened subframe to schedule PDSCH, so as to demodulate PDSCH data as early as possible. Shortened subframes of other lengths are suitable to be scheduled by EPDCCH, e.g., shortened subframes whose length is 1 or 2 OFDM symbols. There is no OFDM symbols dedicated for control signaling transmission, control signaling shares OFDM symbols with PDSCH, which can reduce resources occupied by the control signaling.

For the same UE, in a downlink subframe n, whether downlink subframe of 1 ms is scheduled by a PDCCH in a UE-specific search space or by an EPDCCH in a UE-specific search space is configured by higher layer signaling. Whether shortened downlink subframes in the same downlink subframe are scheduled by PDCCH or by EPDCCH is determined independently from that of the downlink subframe of 1 ms. For example, whether shortened downlink subframes in the same downlink subframe are scheduled by PDCCH or EPDCCH is configured by another higher layer signaling. Or, the scheduling manner of the shortened downlink subframes in the same downlink subframe as to whether they are scheduled by PDCCH or by EPDCCH may be the same with that of the downlink subframe of 1 ms.

For the same UE, in a downlink subframe n, whether a downlink subframe of 1 ms is self-scheduled or cross-carrier scheduled is configured by higher layer signaling, and the scheduling manner of shortened downlink subframes in the same downlink subframe as to whether self-scheduled or cross-carrier scheduled is the same with that of the downlink subframe of 1 ms. Or, whether shortened downlink subframes in the same downlink subframe are self-scheduled or cross-carrier scheduled is configured by another higher layer signaling.

If a shortened downlink subframe is cross-carrier scheduled, the serving cell which schedules the shortened subframe may be configured with shortened downlink subframe, or may not be configured with shortened downlink subframe. If the serving cell which schedules the shortened subframe is configured with shortened downlink subframe, a shortened downlink subframe m in a downlink subframe n in a serving cell cross-carrier schedules a shortened downlink subframe m in a downlink subframe n in another serving cell, as shown in FIG. 5. If the shortened subframe m being scheduled in the subframe n in the scheduled serving cell is a downlink shortened subframe, and the downlink subframe in the scheduling serving cell does not support downlink shortened subframe, there are two scheduling manners. According to the one scheduling manner, PDCCH of a downlink subframe of 1 ms schedules the first downlink shortened subframe, and downlink shortened subframes except the first downlink shortened subframe in each downlink subframe are not scheduled, as shown in FIG. 6. According to the other scheduling manner, PDCCH of the downlink subframe of 1 ms can cross-carrier schedule all of downlink shortened subframes in the downlink subframe, as shown in FIG. 7.

Corresponding to the above method, the present application also provides a device. FIG. 8 is a schematic diagram illustrating a preferred structure of the device. As shown in FIG. 8, the device includes: a resources determining module and a detecting module.

The resource determining module is configured for determining a time-frequency position of a candidate PDCCH/EPDCCH which schedules PDSCH/PUSCH of a shortened subframe.

The detecting module is configured for performing a pre-determined number of blind detections of the candidate PDCCH/EPDCCH according to the time-frequency position.

It can be seen from the above embodiments, the technical mechanism of the present application can make a UE to determining the time-frequency position of a PDCCH and an EPDCCH which schedules a shortened subframe, so that the shortened subframe can function normally and time delay in data transmission can be reduced.

The foregoing are only preferred examples of the present disclosure and are not for use in limiting the protection scope thereof. All modifications, equivalent replacements or improvements in accordance with the spirit and principles of the present disclosure shall be included in the protection scope of the present disclosure.

The invention claimed is:

1. A method for transmitting control information by a base station in a communication system, the method comprising:
   transmitting, to a user equipment (UE), higher layer signaling configuring a resource of a first physical downlink control channel (PDCCH) to be used to schedule data transmission in a unit of shortened transmission time interval (TTI), the higher layer signaling comprising first information indicating which one of a demodulation reference signal (DMRS)-based demodulation or a non-DMRS-based demodulation is used for the first PDCCH;
   transmitting, on the first PDCCH, to the UE, control information which schedules a physical downlink shared channel (PDSCH) in a shortened TTI of a TTI, based on the higher layer signaling; and
   transmitting, to the UE, the PDSCH in the shortened TTI of the TTI, based on the control information,
   wherein the TTI includes multiple shortened TTIs,
   wherein a firstly located shortened TTI of the multiple shortened TTIs within the TTI is scheduled by a second PDCCH, the second PDCCH transmitted by the base station for scheduling data transmission in a unit of TTI, and
   wherein remaining shortened TTI except the firstly located shortened TTI within the TTI is scheduled by the first PDCCH.

2. The method of claim 1,
   wherein the higher layer signaling further comprises second information indicating a number of orthogonal frequency division multiplex (OFDM) symbols occupied by the first PDCCH, and
   wherein the number of OFDM symbols occupied by the first PDCCH is 1, 2, or 3.

3. The method of claim 1, wherein a first resource in the shortened TTI is indicated by the first PDCCH.

4. The method of claim 1,
   wherein a serving cell scheduling the shortened TTI is configured with a shortened downlink TTI, and
   wherein the serving cell is further configured to cross-carrier schedule a shortened downlink TTI m in a downlink TTI n in the serving cell to a shortened downlink TTI m in a downlink TTI n in another serving cell.

5. The method of claim 1, further comprising:
   transmitting, on the first PDCCH, to the UE, another control information which schedules a physical uplink shared channel (PUSCH) in another shortened TTI, based on the higher layer signaling; and
   receiving, from the UE, the PUSCH in the another shortened TTI within another TTI based on the another control information, wherein the another TTI includes multiple shortened TTIs.

6. A method for receiving control information by a user equipment (UE) in a communication system, the method comprising:
   receiving, from a base station, higher layer signaling configuring a resource of a first physical downlink control channel (PDCCH) to be used to schedule data transmission in a unit of shortened transmission time interval (TTI), the higher layer signaling comprising first information indicating which one of a demodulation reference signal (DMRS)-based demodulation or a non-DMRS-based demodulation is used for the first PDCCH;

receiving, on the first PDCCH, from the base station, control information which a physical downlink shared channel (PDSCH) in a shortened TTI of a TTI, based on the higher layer signaling; and receiving, from the base station, the PDSCH in the shortened TTI of the TTI, based on the control information, wherein the TTI includes multiple shortened TTIs, and wherein a firstly located shortened TTI of the multiple shortened TTIs within the TTI is scheduled by a second PDCCH, the second PDCCH transmitted by the base station for scheduling data transmission in a unit of TTI, and wherein remaining shortened TTI except the firstly located shortened TTI within the TTI is scheduled by the first PDCCH.

7. The method of claim 6, wherein the higher layer signaling further comprises second information indicating a number of orthogonal frequency division multiplex (OFDM) symbols occupied by the first PDCCH, and wherein the number of OFDM symbols occupied by the first PDCCH is 1, 2, or 3.

8. The method of claim 6, wherein a first resource in the shortened TTI is indicated by the first PDCCH.

9. The method of claim 6, wherein a serving cell scheduling the shortened TTI is configured with a shortened downlink TTI, and wherein the serving cell is further configured to cross-carrier schedule a shortened downlink TTI m in a downlink TTI n in the serving cell to a shortened downlink TTI m in a downlink TTI n in another serving cell.

10. The method of claim 6, further comprising:

receiving, on the first PDCCH, to the UE, another control information which schedules a physical uplink shared channel (PUSCH) in another shortened TTI, based on the higher layer signaling; and transmitting, to the base station, the PUSCH in the another shortened TTI within another TTI based on the another control information, wherein the another TTI includes multiple shortened TTIs.

11. A base station for transmitting control information in a communication system, the base station comprising:

a transceiver;

a processor coupled to the transceiver; and a memory, coupled to the processor, the memory storing one or more computer programs configured to be executed by the processor, the one or more computer programs including instructions for:

transmitting, to a user equipment (UE), higher layer signaling configuring a resource of a first physical downlink control channel (PDCCH) to be used to schedule data transmission in a unit of shortened transmission time interval (TTI), the higher layer signaling comprising first information indicating which one of a demodulation reference signal (DMRS)-based demodulation or a non-DMRS-based demodulation is used for the first PDCCH, transmitting, on the first PDCCH, to the UE, control information which schedules a physical downlink shared channel (PDSCH) in a shortened TTI of a TTI, based on the higher layer signaling, and transmitting, to the UE, the PDSCH in the shortened TTI of the TTI, based on the control information, wherein the TTI includes multiple shortened TTIs, wherein a firstly located shortened TTI of the multiple shortened TTIs within the TTI is scheduled by a second PDCCH, the second PDCCH transmitted by the base station for scheduling data transmission in a unit of TTI, and wherein remaining shortened TTI except the firstly located shortened TTI within the TTI is scheduled by the first PDCCH.

12. The base station of claim 11, wherein the higher layer signaling further comprises second information indicating a number of orthogonal frequency division multiplex (OFDM) symbols occupied by the first PDCCH, and wherein the number of OFDM symbols occupied by the first PDCCH is 1, 2, or 3.

13. The base station of claim 11, wherein a first resource in the shortened TTI is indicated by the first PDCCH.

14. The base station of claim 11, wherein the one or more computer programs further comprises instructions for:

transmitting, on the first PDCCH, to the UE, another control information which schedules a physical uplink shared channel (PUSCH) in another shortened TTI, based on the higher layer signaling; and receiving, from the UE, the PUSCH in the another shortened TTI within another TTI based on the another control information, wherein the another TTI includes multiple shortened TTIs.

15. A user equipment (UE) for receiving control information in a communication system, the UE comprising:

a transceiver; and a processor coupled to the transceiver; and a memory, coupled to the processor, the memory storing one or more computer programs configured to be executed by the processor, the one or more computer programs including instructions for:

receiving, from a base station, higher layer signaling configuring a resource of a first physical downlink control channel (PDCCH) to be used to schedule data transmission in a unit of shortened transmission time interval (TTI), the higher layer signaling comprising first information indicating which one of a demodulation reference signal (DMRS)-based demodulation or a non-DMRS-based demodulation is used for the first PDCCH, receiving, on the first PDCCH, from the base station, control information which a physical downlink shared channel (PDSCH) in a shortened TTI of a TTI, based on the higher layer signaling, and receiving, from the base station, the PDSCH in the shortened TTI of the TTI, based on the control information, wherein the TTI includes multiple shortened TTIs, and wherein a firstly located shortened TTI of the multiple shortened TTIs within the TTI is scheduled by a second PDCCH, the second PDCCH transmitted by the base station for scheduling data transmission in a unit of TTI, and wherein remaining shortened TTI except the firstly located shortened TTI within the TTI is scheduled by the first PDCCH.

16. The UE of claim 15, wherein the higher layer signaling further comprises second information indicating a number of orthogonal frequency division multiplex (OFDM) symbols occupied by the first PDCCH, and wherein the number of OFDM symbols occupied by the first PDCCH is 1, 2, or 3.

17. The UE of claim 15, wherein a first resource in the shortened TTI is indicated by the first PDCCH.

18. The UE of claim 15, wherein the one or more computer programs further comprises instructions for:
- receiving, on the first PDCCH, to the UE, another control information which schedules a physical uplink shared channel (PUSCH) in another shortened TTI, based on the higher layer signaling; and
- transmitting, to the base station, the PUSCH in the another shortened TTI within another TTI based on the another control information, wherein the another TTI includes multiple shortened TTIs.

\* \* \* \* \*